United States Patent

Williams

[15] 3,635,655
[45] Jan. 18, 1972

[54] MINERAL TANNED LEATHER TREATED WITH DIALDEHYDE STARCH AND BENZENE POLYCARBOXYLIC ACID COMPOSITIONS

[72] Inventor: Richard Nathan Williams, Sloatsburg, N.Y.

[73] Assignee: Ciba-Geigy Corporation, Ardsley, N.Y.

[22] Filed: Feb. 15, 1968

[21] Appl. No.: 705,634

[52] U.S. Cl. ............................8/94.26, 8/94.25, 8/94.33, 260/233.3
[51] Int. Cl. ..................................................C14c 3/28
[58] Field of Search........................................8/94.33, 94.26

[56] References Cited

UNITED STATES PATENTS

| | | | |
|---|---|---|---|
| 2,886,401 | 5/1959 | Wells et al. | 8/94.33 |
| 3,293,057 | 12/1966 | Rumberger | 8/116.3 X |

*Primary Examiner*—George F. Lesmes
*Assistant Examiner*—H. Wolman
*Attorney*—Karl F. Jorda and Bruce M. Collins

[57] ABSTRACT

Mineral tanned leather is stabilized against degradation due to warm or hot alkaline washings by applying thereto during tanning or retanning an aqueous solution of from about 5 parts to about 1 part dialdehyde starch and from about 1 part to about 5 parts of a benzene polycarboxylic acid or alkali metal salt thereof based on the weight of the leather. A 5 percent solution based on the weight of the hide of a 1:1 composition of dialdehyde starch and sodium isophthalate is preferred.

8 Claims, No Drawings

MINERAL TANNED LEATHER TREATED WITH DIALDEHYDE STARCH AND BENZENE POLYCARBOXYLIC ACID COMPOSITIONS

BACKGROUND OF THE INVENTION

This invention relates to an improved process and composition for improving the quality of mineral tanned and retanned leathers.

This invention is particularly useful in the prevention of detannage and consequent degradation of mineral tanned leathers due to warm or hot alkaline washings.

Many previous efforts to improve the quality of mineral tanned leathers have employed the use of aldehyde functional groups. For instance, formaldehyde and glutaraldehyde have been used for years as tanning agents either alone or in conjunction with chromium salts, zirconium salts, aluminum salts, vegetable tannages and/or synthetic tanning agents.

Of increasing interest recently is the use of dialdehyde starch which is obtained by the oxidation of starch to convert a significant percentage of the anhydroglucose units to dialdehyde units:

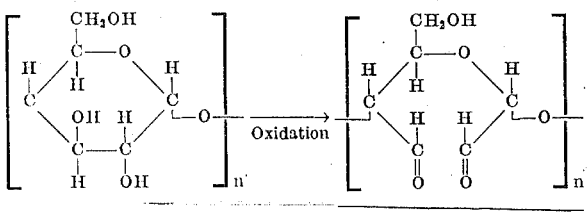

A dialdehyde starch can more properly be considered a polymeric dialdehyde.

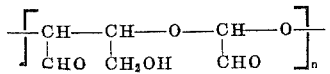

Among the processes for the production of this material are those described in U.S. Pat. Nos. 2,648,629 and 2,713,533.

The general use of dialdehyde starch as a tanning agent is described in U.S. Pat. No. 2,886,401. Various methods of solubilizing the dialdehyde starch in order to produce aqueous tanning solutions are likewise disclosed in that patent. A dialdehyde starch in which 80 percent of the anhydroglucose units have been oxidized to dialdehyde units and which is available in soluble form is sold under the trademark designation DASOL A from Miles Laboratories, Inc., Elkhart, Ind.

Finding methods of increasing the resistance of leather to detannage and degradation due to washings, particularly warm or hot alkaline washings, is an ever present problem in the leather industry. No completely satisfactory solution has yet been discovered.

THE INVENTION

The present invention provides a means for greatly increasing the stability of mineral tanned leathers which comprise most of the leather produced today by applying to the hide, during retanning or in the mineral tannage of leather, a tanning agent comprising, in combination, a dialdehyde starch and a benzene polycarboxylic acid or alkali metal salt thereof.

The increased stability of mineral tanned leather to alkaline washing made possible by the practice of this invention is evident by improved shrinkage temperatures, maintenance of tensile strength, as well as a generally improved hand of the leather and other improved characteristics. Examples of the benzene polycarboxylic acids contemplated by this invention are phthalic, isophthalic, terephthalic, trimellitic, trimesic, pyrromellitic, mellitic, hemimellitic, mellophanic, and prehnitic acids. Mixtures of the foregoing type of polycarboxylic acids are also contemplated.

The dialdehyde starch used in the practice of this invention has at least 50 percent dialdehyde units and preferably over 80 percent.

Although, for example, pyrromellitic and mellitic acids give somewhat better results in combination with the dialdehyde starch, the preferred acid employed in the practice of this invention is isophthalic acid in the form of the sodium isophthalate because of its general availability and low cost, together with the attainment of very satisfactory results.

In this application, the terms hides, skins and leather are meant to include all animal hides, skins and furs that are commercially tanned, and in particular, cowhide, horsehide, calfskin, pigskin, sheepskin, and goatskin, as well as leathers made by the conventional tannage of such hides.

According to this invention, the untanned hides or leather is treated with an aqueous solution which contains from about 1 to about 10 percent by weight of the hide or leather, of a composition comprising from about 5 parts of dialdehyde starch to about 1 part of a benzene polycarboxylic acid to about 1 part of dialdehyde starch to about 5 parts of benzene polycarboxylic acid. In general, a 5 percent solution of dialdehyde starch and benzene polycarboxylic acid in a 1:1 ratio is preferred. Other conventional tanning agents may, of course, be employed in conjunction with the composition of this invention as required by the individual tanner. In the case of previously untanned hides, this will usually be necessary to obtain the desired degree of tannage.

The solution comprising the dialdehyde starch is applied to the hide or leather for about 30 minutes to about 10 hours. The times are not particularly critical and can be adjusted readily to the needs of the individual tanning.

Temperatures generally employed range from about 60° to about 150° F. with a range of 100° to 130° F. preferred where possible considering such factors as whether a retan or initial tanning is contemplated. The pH of the solution during application ranges from 2.5 to 7.

The following examples describing certain representative embodiments of this invention will serve to further illustrate the nature of the invention. It is to be understood that the examples are merely illustrative and intended to enable those skilled in the art to practice the invention in all of the embodiments flowing therefrom and do not in anyway limit the scope of the invention defined in the claims.

EXAMPLE I

An untanned, pickled calfskin was quartered by cutting down the backbone and across the waist. Portions of the hide were treated with solutions which were comprised of 200 percent water at 75° F., 10 percent sodium chloride, and the percentages of sodium isophthalate and dialdehyde starch (DAS) shown in the following table I. All percentages are based on the weights of the samples of hide. Each sample was initially drummed in the solution for about 30 minutes. Thereafter there was added to each: 17 percent by weight of the hide of a 32 percent active solution of sodium zirconyl sulfate and drumming continued for 3 hours. The pH was then raised by small additions of sodium bicarbonate over an additional 3-hour period of drumming so that in each instance the final pH was 4.3. The samples were then washed and dried and cut into pieces of 8 square inches each. The samples were tested according to AATCC Wash Test No. 3 with the results as shown in table I. The general appearance of each sample after the test is also indicted in table I.

TABLE I

| | Percent acid | Percent DAS | pH after initial drum | pH, 3 hours | Appearance, after drying | AATCC Wash Test No. 3 (square inches) Before | AATCC Wash Test No. 3 (square inches) After | Visual, after test |
|---|---|---|---|---|---|---|---|---|
| A | 3.0 | | 4.5 | 2.2 | White, full good break. | 8.0 | 5.0 | Grey, hard unusable, too denatured. |
| B | | 3.0 | 2.8 | 2.1 | do | 8.0 | 6.0 | Creamy, slightly firm, barely usable. |
| C | 3.0 | 3.0 | 4.5 | 2.2 | White, fuller good break. | 8.0 | 7.6 | Yellow, usable. |

TABLE II

| | Percent Acid | DAS | Chromium salt | Number of washings 0 | 1 | 3 | 5 | 7 |
|---|---|---|---|---|---|---|---|---|
| | | | | Temperatures after AATCC Wash Test No. 2 (° F.) | | | | |
| D | 2.5 | | 10 | [1][2] 212 | 212 | 212 | 192 | 190 |
| E | | 2.5 | 10 | [2] 212 | 206 | 195 | 188 | 178 |
| F | 2.5 | 2.5 | 10 | [2] 212 | 212 | 212 | 208 | 198 |
| G | 5.0 | 2.5 | 10 | [2] 212 | 212 | 212 | 208 | 203 |

[1] When the $T_S$ is 212° F. or higher the length of time the leather maintains stability at 212° F. is a measure of the degree of tannage.
[2] 3 minutes.

TABLE III

| | Percent acid | Percent DAS | pH after— 1st drum | 2nd drum | 3rd drum | AATCC Wash Test No. 2 0 washing | 3 washings | 7 washings |
|---|---|---|---|---|---|---|---|---|
| Hide No. 1: | | | | | | | | |
| H | | | 3.85 | 6.0 | 7.0 | 1 min. at 212° F | 186° F | 158° F |
| I | | 3 | 4.0 | 5.9 | 6.7 | 3 min. at 212° F | 200° F | 177° F |
| J | [1] 1 | 3 | 4.8 | 6.0 | 6.6 | do | 210° F | 191° F |
| Hide No. 2: | | | | | | | | |
| K | | | 4.15 | 6.0 | 6.5 | 1 min. at 212° F | 82° F | 162° F |
| L | | 3 | 4.3 | 5.5 | 6.7 | 3 min. at 212° F | 195° F | 180° F |
| M | [2] 1 | 3 | 5.05 | 6.0 | 6.8 | do | 210° F | 205° F |
| Hide No. 3: | | | | | | | | |
| N | | | 3.8 | 5.15 | 6.8 | 1 min. at 212° F | 183° F | 157° F |
| O | | 3 | 3.75 | 4.7 | 6.5 | 3 min. at 212° F | 194° F | 165° F |
| P | [3] 1 | 3 | 4.4 | 5.2 | 6.6 | do | 212° F | 204° F |
| Hide No. 4: | | | | | | | | |
| Q | | | 3.5 | 5.0 | 6.8 | 1 min. at 212° F | 182° F | 161° F |
| R | | 3 | 3.6 | 4.4 | 6.8 | 2 min. at 212° F | 190° F | 174° F |
| S | [4] 1 | 3 | 4.4 | 4.8 | 6.2 | 3 min. at 212° F | 212° F | 202° F |

[1] Trimellitic.
[2] Trimesic.
[3] Pyromellitic.
[4] Mellitic.

The dialdehyde starch employed in example I and the following examples had a minimum 80 percent content of dialdehyde units and was previously solubilized. DASOL A Miles Laboratories, Inc., Elkhart, Ind.

EXAMPLE II

Samples of a pickled calfskin were tanned as follows. The samples were treated with solutions comprised of 100 percent water at 75° F., 5 percent sodium chloride and the percentages of sodium isophthalate and dialdehyde starch (DAS) shown in table II. Each sample was drummed in the corresponding solution, initially for 30 minutes, and thereafter there was added to each sample 100 percent by weight of water at 75° F. and 10 percent by weight of a commercial chrome tanning salt, all percentages based upon the weight of the hide. The samples were then drummed for 4½ hours, during the last hour and a half of which the pH was raised to 3.6 by additions of small increments of sodium bicarbonate. The samples were then washed, neutralized and air dried. A portion of each sample was then subjected to AATCC Wash Test No. 2 with the results indicated in table II.

EXAMPLE III

Four previously chrome-tanned calfskins were quartered and samples thereof retanned as follows:

Each hide was treated with a control solution, a solution containing dialdehyde starch (3 percent), and a solution containing a benzene polycarboxylic acid (1 percent) and dialdehyde starch (3 percent). As in the previous examples, all percentages are based upon the weight of the hide treated. Each solution initially is comprised of 150 percent water at 120° F. The solutions containing dialdehyde starch, and those with the benzene polycarboxylic acid and dialdehyde starch also contained approximately 1 percent soda ash and 0.25 percent sodium formate.

In table III, the enhanced results obtained with the combination of dialdehyde starch and a benzene polycarboxylic acid are illustrated with trimellitic, trimesic, pyrromellitic, and mellitic acid respectively for hides numbers 1, 2, 3, and 4. In each case, the sample of hide was drummed in the particular solution for 40 minutes and the pH determined. Fifty percent water and 0.5 percent ammonium bicarbonate were then added and drumming continued an additional 40 minutes and the pH determined. The hides were then washed in water at 130° F. and drained. Thereafter there was then added to each sample of hide 100 percent water and 4.0 percent neats-foot oil at 130° F. and drumming continued for an additional 40 minutes after which the hides were drained and dried. The samples of leather were then subjected to AATCC Wash Test No. 2. The shrinkage temperatures after no washings, three washings, and seven washings are shown in table III. The tests clearly demonstrate the greatly enhanced results achieved in improving the stability of leather with compositions of this invention.

EXAMPLE IV

The general procedure of example III was repeated, using however:

A. 1 percent sodium isophthalate and 1 percent dialdehyde starch;

B. 2 percent sodium terephthalate and 8 percent dialdehyde starch;

C. 3 percent hemimellitic acid and 2 percent dialdehyde starch; and

D. 2 percent mellophanic acid and 3 percent dialdehyde starch.

In each instance, leather treated with the solutions exhibited greatly enhanced stability.

While the invention has been explained by detailed description of certain specific embodiments, it is understood that various modifications and substitutions can be made in any of them within the scope of the appended claims which are intended also to include equivalents of such embodiments.

What is claimed is:

1. A method of improving the resistance of mineral tanned leather hide to degradation due to washing comprising applying to said hide an aqueous solution comprising from about 1 to about 5 percent of dialdehyde starch having at least 50 percent dialdehyde units and from about 5 to about 1 percent of a benzene polycarboxylic acid or an alkali metal salt thereof based on the weight of the hide, at a pH of about 2.0 to about 7, for about 30 minutes to 10 hours, at a temperature of from about 60° to about 150° F.

2. A method as claimed in claim 1 wherein said acid is isophthalic acid or the sodium salt thereof and the temperature is from about 100° to about 120° F.

3. A method as claimed in claim 2 wherein from 3 percent to 2 percent of the dialdehyde starch and from 2 percent to 3 percent of the acid or the salt thereof is employed.

4. A composition of matter comprising from about 1 part to about 5 parts by weight of a dialdehyde starch having at least 50 percent dialdehyde units and from about 5 parts to about 1 part by weight of a benzene polycarboxylic acid or an alkali metal salt thereof, said composition producing a pH of about 2.0 to about 7 when added to water.

5. A composition of matter as claimed in claim 4 wherein said acid is isophthalic acid or the sodium salt thereof.

6. A composition of matter as claimed in claim 4 wherein said starch and said acid or salt thereof are present in about equal parts by weight.

7. A composition of matter as claimed in claim 5 comprising about 1 part by weight of dialdehyde starch and about 1 part by weight of sodium isophthalate.

8. A composition of matter as claimed in claim 7 wherein said dialdehyde starch is a starch wherein at least 80 percent of the anhydroglucose units have been oxidized to dialdehyde units.

* * * * *